United States Patent
Bland et al.

(10) Patent No.: US 9,302,340 B2
(45) Date of Patent: Apr. 5, 2016

(54) METHOD AND APPARATUS FOR CONTROLLING A WELDING SYSTEM

(75) Inventors: Fredric A. Bland, Shepard, MI (US); Michael A. Long, Springfield, MO (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 2137 days.

(21) Appl. No.: 12/299,008

(22) PCT Filed: Aug. 17, 2007

(86) PCT No.: PCT/US2007/076231
§ 371 (c)(1),
(2), (4) Date: Oct. 29, 2008

(87) PCT Pub. No.: WO2008/022326
PCT Pub. Date: Feb. 21, 2008

(65) Prior Publication Data
US 2009/0200283 A1    Aug. 13, 2009

Related U.S. Application Data

(60) Provisional application No. 60/822,847, filed on Aug. 18, 2006.

(51) Int. Cl.
*B23K 9/10* (2006.01)
(52) U.S. Cl.
CPC .................................. *B23K 9/1087* (2013.01)
(58) Field of Classification Search
CPC .................................................... B23K 9/1087
USPC .................................... 219/74, 132; 228/219
See application file for complete search history.

(56) References Cited

U.S. PATENT DOCUMENTS

| | | |
|---|---|---|
| 3,759,115 A | 9/1973 | Dibonaventura et al. |
| D246,648 S | 12/1977 | Braaten |
| D246,649 S | 12/1977 | Braaten |
| D249,505 S | 9/1978 | Di Bonaventura |
| 4,216,368 A * | 8/1980 | Delay ........................... 219/132 |
| 4,410,789 A | 10/1983 | Story |
| 5,247,449 A * | 9/1993 | Yoshida ........................ 700/136 |
| 5,535,642 A | 7/1996 | Moll |
| 5,793,016 A | 8/1998 | Colling et al. |
| D398,290 S | 9/1998 | McClintock |
| 6,040,537 A | 3/2000 | McClintock |
| 6,040,555 A | 3/2000 | Tiller et al. |

(Continued)

FOREIGN PATENT DOCUMENTS

WO    2008063736 A1    5/2008

*Primary Examiner* — Jianying Atkisson
(74) *Attorney, Agent, or Firm* — Perkins Coie LLP

(57) ABSTRACT

A wireless control system (10) for a welding system (12) including an electrical control interface (18). The control system (10) may generally comprise a foot pedal (14) and a receiver (16). The foot pedal (14) may include a pivotable housing (20), a sensing element (22) operable to sense a position of the pivotable housing (20) and provide a corresponding pedal position signal, and a transmitter (24) operable to wirelessly transmit the pedal position signal. The receiver (16) may include an antenna (36) operable to wirelessly receive the pedal position signal generated by the foot pedal (14), a processor (38) operable to process the received pedal position signal, and a connector (40) operable to connect with the electrical control interface (18) associated with the welding system (12) to provide the processed pedal position signal thereto.

19 Claims, 6 Drawing Sheets

(56) References Cited

U.S. PATENT DOCUMENTS

| | | | |
|---|---|---|---|
| 6,075,225 A * | 6/2000 | Heraly et al. | 219/130.5 |
| 6,103,994 A | 8/2000 | DeCoster et al. | |
| 6,326,592 B1 | 12/2001 | Colling | |
| 6,531,673 B2 * | 3/2003 | Fedorcak | 219/74 |
| 6,841,752 B2 | 1/2005 | Ward | |
| 7,205,503 B2 * | 4/2007 | Reynolds et al. | 219/132 |
| 7,245,898 B2 | 7/2007 | Van Bosch et al. | |
| 7,336,259 B2 * | 2/2008 | Li et al. | 345/163 |
| 7,381,922 B2 * | 6/2008 | Ulrich | 219/132 |
| 2002/0144979 A1 * | 10/2002 | Fedorcak | 219/74 |
| 2003/0062354 A1 | 4/2003 | Ward | |
| 2005/0103768 A1 | 5/2005 | Ward | |
| 2005/0219062 A1 * | 10/2005 | Van Bosch et al. | 340/825.72 |

* cited by examiner

METHOD AND APPARATUS FOR CONTROLLING A WELDING SYSTEM

RELATED APPLICATION

The present application claims the benefit of U.S. Provisional Patent Application No. 60/822,847, entitled "REMOTE CONTROL PEDAL APPARATUSES FOR WELDING ASSEMBLIES AND METHODS OF USING THE PEDAL APPARATUSES," filed Aug. 18, 2006. The identified provisional application is incorporated herein by specific reference.

BACKGROUND

1. Field

Embodiments of the present invention relate to methods and apparatuses for controlling welding systems. More particularly, various embodiments of the invention provide methods and apparatuses for wirelessly controlling welding systems with remote foot pedals.

2. Description of the Related Art

Welding systems, such as tungsten inert gas (TIG), metal inert gas (MIG), and shielded metal arc (SMAW) welding systems, may be controlled by foot pedals to enable operators to vary welding parameters. Typically, foot pedals are difficult to interface with welding systems or are connected to welding systems by cables-thereby inhibiting operator movement and pedal use.

SUMMARY

Embodiments of the present invention provide a distinct advance in the art of welding system control. More particularly, various embodiments of the invention provide methods and apparatuses for wirelessly controlling welding systems with remote foot pedals.

In some embodiments, the present invention provides a receiver operable to be utilized with a welding system including an electrical control interface. The receiver may generally comprise an antenna, a processor coupled with the antenna, and a connector coupled with the processor. The antenna is operable to wirelessly receive a pedal position signal generated by a remote foot pedal, the processor is operable to process the received pedal position signal, and the connector is operable to connect with the electrical control interface associated with the welding system to provide the processed pedal position signal thereto.

In some embodiments, the present invention provides a wireless control system for a welding system including an electrical control interface. The control system may generally comprise a foot pedal and a receiver. The foot pedal may include a pivotable housing, a sensing element operable to sense a position of the pivotable housing and provide a corresponding pedal position signal, and a transmitter operable to wirelessly transmit the pedal position signal. The receiver may include an antenna operable to wirelessly receive the pedal position signal generated by the foot pedal, a processor operable to process the received pedal position signal, and a connector operable to connect with the electrical control interface associated with the welding system to provide the processed pedal position signal thereto.

It is to be understood that both the foregoing general description and the following detailed description are exemplary and explanatory only and are not necessarily restrictive of the invention claimed. The accompanying drawings, which are incorporated in and constitute a part of the specification, illustrate embodiments of the invention and together with the general description, serve to explain the principles of the invention.

BRIEF DESCRIPTION OF THE DRAWING FIGURES

Various embodiments of the present invention are described in detail below with reference to the attached drawing figures, wherein.

Figure 1:
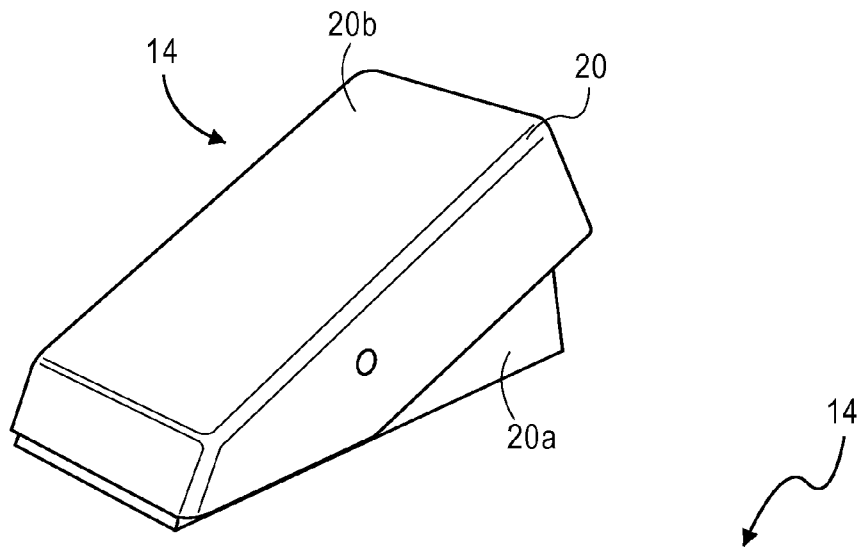
FIG. 1 is a front perspective view of a foot pedal configured in accordance with various embodiments of the present invention.

The drawing figures do not limit the present invention to the specific embodiments disclosed and described herein. The drawings are not necessarily to scale, emphasis instead being placed upon clearly illustrating various embodiments of the invention.

DETAILED DESCRIPTION

The following detailed description of various embodiments of the invention references the accompanying drawings which illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Figure 5:
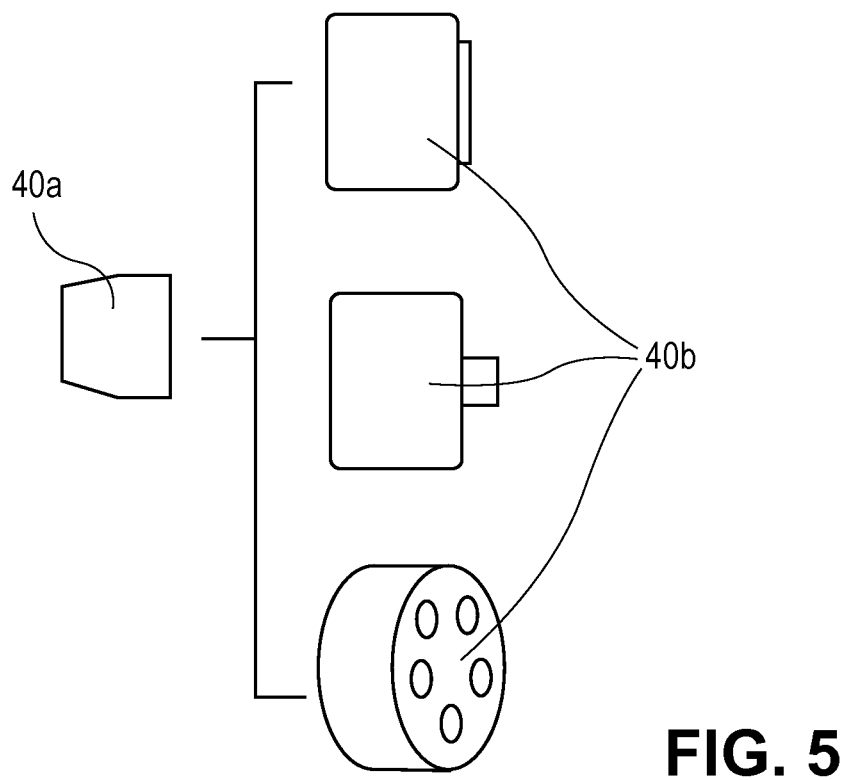
FIG. 5 is a schematic view of a connector operable to be utilized by the receiver of FIG. 4.

Referring initially to FIG. 5, various embodiments of the present invention provide a wireless control system 10 operable to control one or more functions of a welding system 12. The control system 10 may include a foot pedal 14 operable to wirelessly transmit a pedal position signal to a receiver 16. The receiver 16 is operable to connect with an electrical control interface 18 associated with the welding system 12 to enable the welding system 12 to be wirelessly controlled through operation of the foot pedal 14.

The welding system 12 may be any welding system including the electrical control interface 18 to enable the reception of an electrical signal for control of one or more functions of the welding system 12. For example, the welding system 12 may be a tungsten inert gas (TIG), metal inert gas (MIG), and/or shielded metal arc (SMAW) welding system. In some embodiments, the welding system 12 is a TIG system and the electrical control interface 18 is an amperage control interface operable to receive a control signal to vary the output current of the welding system 12. For example, the welding system 12 may be a Syncrowave® 350 LX TIG/STICK welding system manufactured by Miller Electric Mfg Co. including the electrical control interface 18 to couple with a cable associated with a control device such as a wired foot pedal. Thus, the control system 10 may be adapted to replace a wired foot pedal associated with the welding system 12. However, the control system 10 may be adapted to control any function of any welding system having an electrical control interface.

Figure 2:
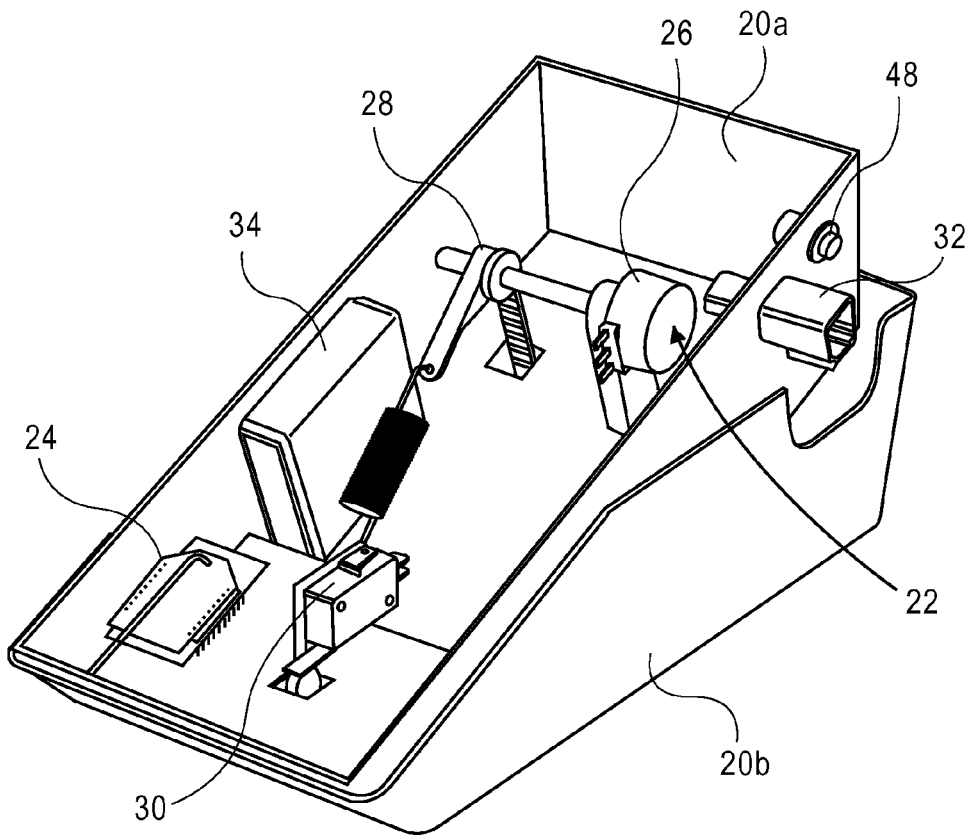
FIG. 2 is a rear perspective view of the foot pedal of FIG. 1.
Figure 3:
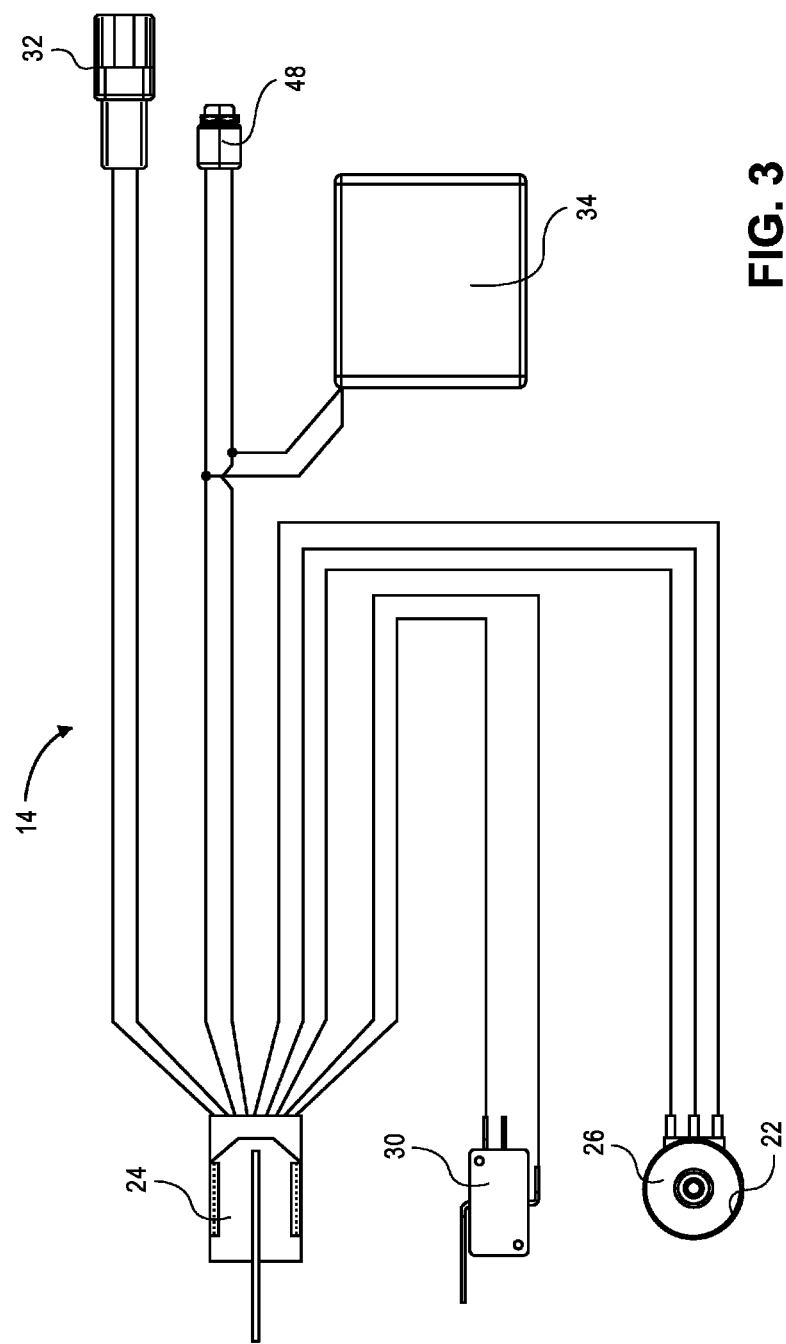
FIG. 3 is a schematic diagram of some components of the foot pedal of FIG. 1.

Referring to FIGS. 1-3, the foot pedal 14 may include a pivotable housing 20, a sensing element 22 coupled with the pivotable housing 20, and a transmitter 24 coupled with the sensing element 22. The sensing element 22 is operable to sense a position of the pivotable housing 20 and provide a corresponding pedal position signal and the transmitter 24 is operable to wirelessly transmit the pedal position signal for reception by the receiver 16. The various elements of the foot pedal 14 may be discrete elements coupled together utilizing wired or wireless connections. In some embodiments, portions of the foot pedal 14, such as the sensing element 22 and transmitter 24, may be integral.

The pivotable housing 20 is operable to be at least partially pivoted by an operator to generate the pedal position signal for use by the receiver 16. In some embodiments, the pivotable housing 20 may include a base portion 20a and a pivoting portion 20b. The base portion 20a may be configured to remain stationary, even when the pivoting portion 20b is pivoted, such as by including or utilizing weights, flared surfaces, anti-skid elements, surface fasteners, coupling elements, combinations thereof, and the like. The base portion 20a may also be adapted to house various elements associated with the foot pedal 14, such as the sensing element 22 and transmitter 24. In some embodiments, the base portion 20a may include an extendible elevator operable to raise a portion of the housing 20 to facilitate pivoting of the pivoting portion 20b. For example, the extendible elevator may include a U-shaped bracket that is operable to swivel from a recess in the bottom of the base portion 20a to elevate the housing 20.

The pivoting portion 20b is pivotably coupled with the base portion 20a and is operable to be at least partially pivoted by the operator. For example, the operator may press on a portion of the pivoting portion 20b to pivot the pivoting portion 20b in relation to the base portion 20a. In some embodiments, the base portion 20a may present a generally rectangular configuration and the pivoting portion 20b may be presented an angled configuration to enable the pivoting portion 20b to easily pivot in relation to the base portion 20a. However, the pivotable housing 20 may present any configuration that is operable to be at least partially pivoted or otherwise depressed by the operator, including conventional configurations.

The pivotable housing 20 may be formed from various materials, including metals, plastics, combinations thereof, and the like. In some embodiments, the pivotable housing 20 may be comprised of aluminum, steel, or other similar materials to provide rigidity and stability. Alternatively, the pivotable housing 20 may be comprised of poly carbonate or other fiber materials to minimize interference with signals generated by the transmitter 24. Utilization of poly carbonate and other similar materials may reduce or eliminate the need for antennas external to the housing 20.

The sensing element 22 is coupled with the pivotable housing 20 and is operable to sense a position of the pivotable housing 20 and provide the corresponding pedal position signal. Thus, for example, the sensing element 22 may sense the extent to which the pivotable housing 20 has been pivoted by the operator, such as the amount the pivoting portion 20b has been pivoted in relation to the stationary base portion 20a, and provide the corresponding pedal position signal.

In some embodiments, the sensing element 22 may include a rotary potentiometer 26. The potentiometer 26 may be coupled with the pivotable housing 20 to rotate as the pivotable housing 20 pivots. As the potentiometer 26 rotates, the resistance it provides to a supplied current changes to produce the pedal position signal for transmission by the transmitter 24. The potentiometer 26 may be coupled with the pivotable housing 20 in any manner to rotate or otherwise actuate as the housing 20 is pivoted. For example, as illustrated in FIG. 2, the foot pedal 14 may include a spring-biased belt 28 that is coupled with the base portion 20a and pivoting portion 20b. As the pivoting portion 20b pivots, the belt 28 moves across the potentiometer 26 to rotate the potentiometer 26. In some embodiments, the potentiometer 26 may present a non-rotary configuration and additionally or alternatively include linear, spindle operated, panel mount, switched, multi-turn, multi-gang, sealed or unsealed potentiometers. Further, in some embodiments, the sensing element 22 may provide potentiometer-like functionality to detect the position of the pivotable housing 20 without including a potentiometer.

Figure 7:
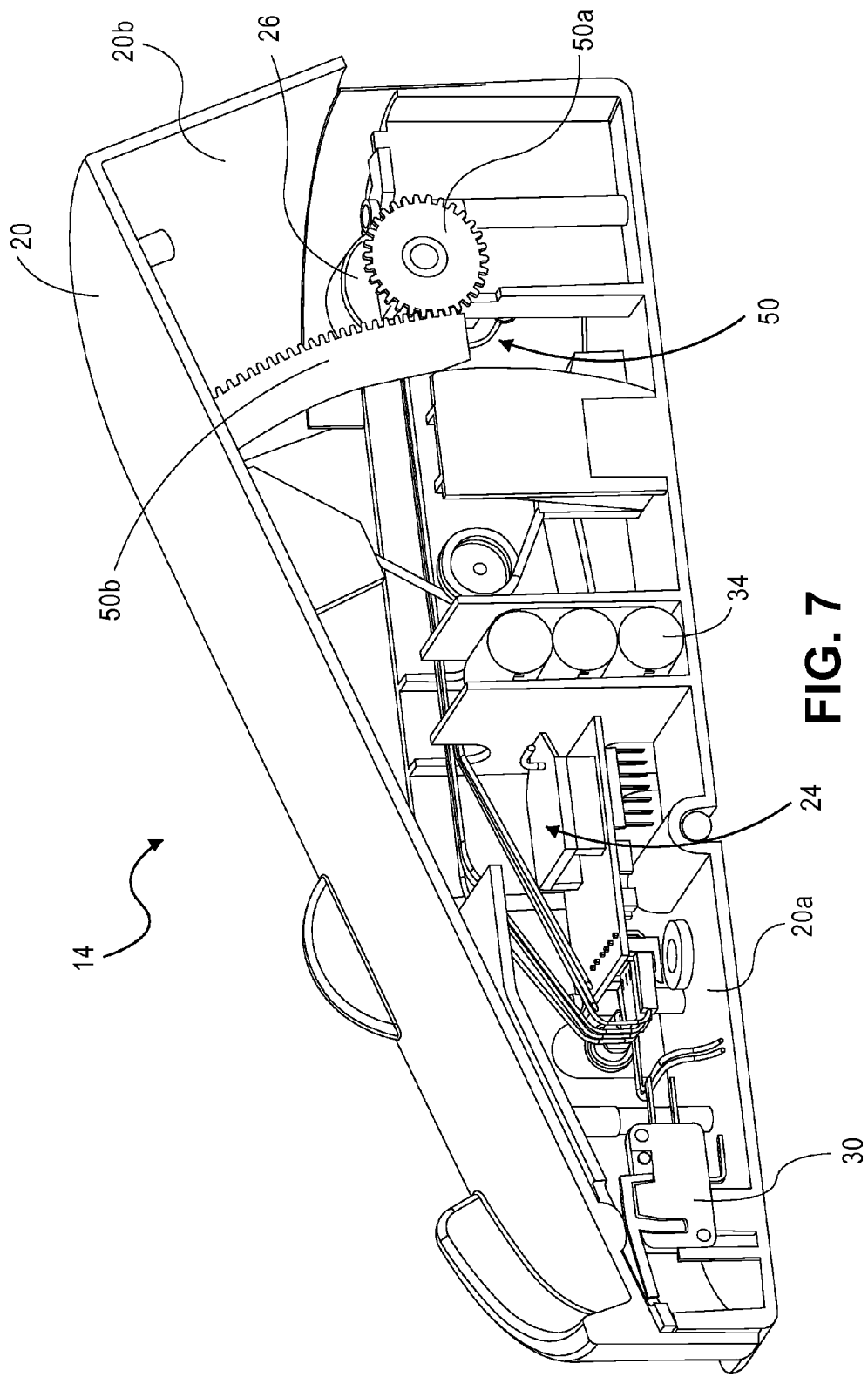
FIG. 7 is a sectional view of another foot pedal configured in accordance with various embodiments of the present invention.
Figure 8:
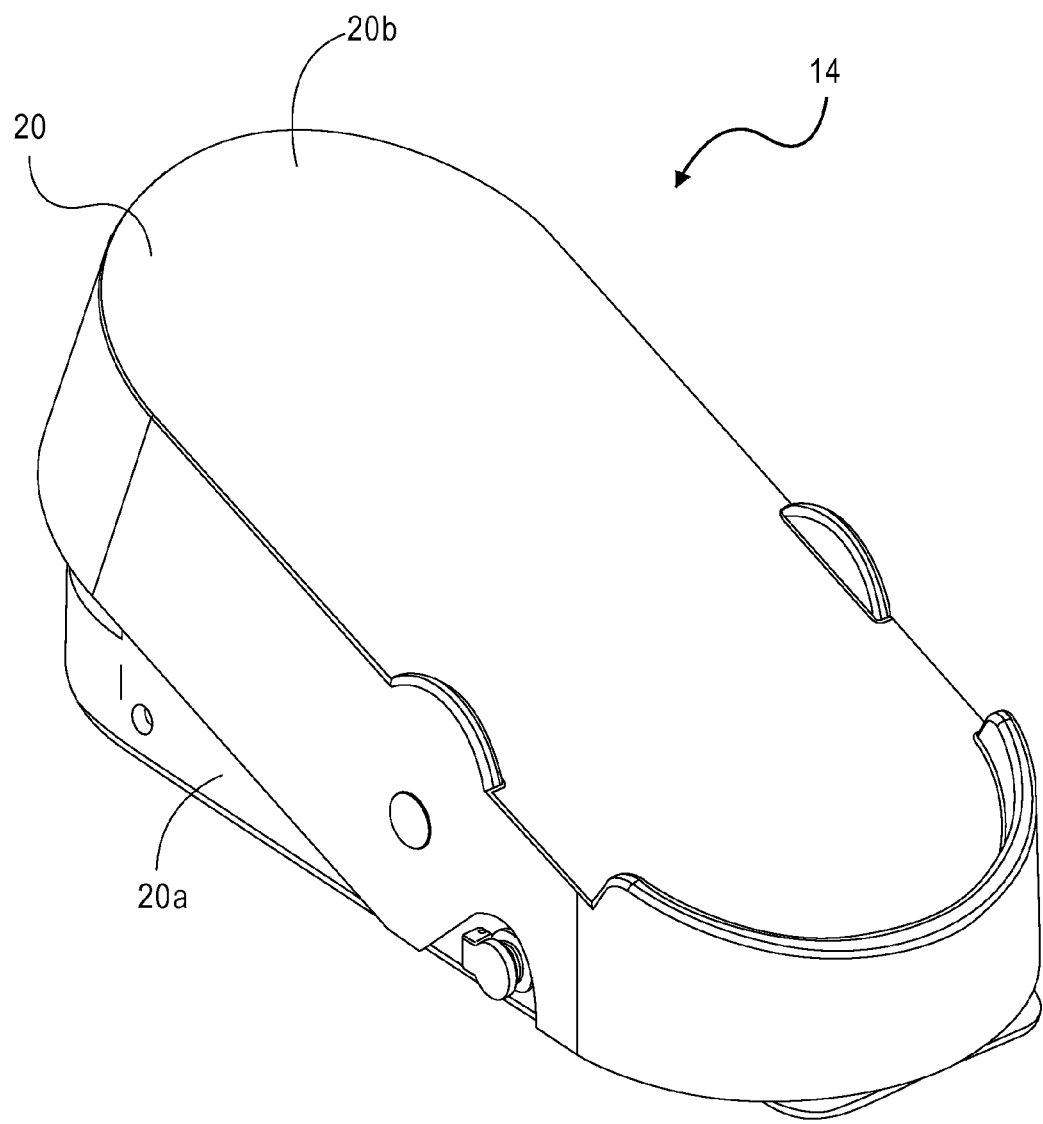
FIG. 8 is a front perspective view of the foot pedal of FIG. 7.

However, the potentiometer 26 may be coupled with the pivotable housing 20 in any manner, including geared configurations, and is not limited to belt-type configurations. For example, as illustrated in FIG. 7, the potentiometer 26 may couple with the pivotable housing 20 using a gear assembly 50. The gear assembly 50 may include a pinion 50a and a rack 50b. The pinion 50a is fixedly connected to the potentiometer 26 which may be fixedly coupled to the base portion 20a of the housing 20. The rack 50b is fixedly coupled to the pivoting portion 20b of the housing 20 such that the rack 50b rotates the pinion 50a—and thus the potentiometer 26 itself—as the pivoting portion 20b is pivoted. The rack 50b may be curved to present a proper interface with the pinion 50a to ensure that that the pinion 50a is properly rotated when the pivoting portion 20 is pivoted.

The sensing element 22 may additionally or alternatively include rotary encoders, piezoelectric sensors, linear voltage detection transmitters, pressure transducers, infrared sensors, optical sensors, magnetic sensors, switches, rheostats, combinations thereof, and the like, to sense the position of the pivotable housing 20 and/or the extent to which the housing 20 is pivoted. In some embodiments, the sensing element 22 may be actuated by linkages or other mechanical couplings associated with the gear assembly 50, as is illustrated in FIG. 7. Thus, the sensing element 22 may include any element or combination of elements operable to sense the position of the pivotable housing 20 and provide the corresponding pedal position signal. The pedal position signal provided by the sensing element 22 may be any analog and/or digital signal.

As illustrated in FIGS. 2-3 and 7, in some embodiments, the foot pedal 14 may also include a limit switch 30 separate from the sensing element 22. The limit switch 30 is operable to be functioned when the pivotable housing 20 is at least partially pivoted and provide a corresponding signal. Thus, the limit switch 30 may detect when the pivotable housing 20 is not being pivoted by the operator (i.e., when the housing 20 is at rest) and when the pivotable housing 20 is being pivoted by the operator (i.e., when the housing 20 is not at rest). For example, the limit switch 30 may be associated with a contact connected to the pivoting portion 20b of the housing 20 such that as the pivoting portion 20b pivots, the contact moves away from the limit switch 30 to enable the limit switch 30 to close and provide a corresponding signal indicating that the pivotable housing 20 has been pivoted by the operator.

The foot pedal 14 may include an integral power source 34 to power the transmitter 24 and/or other components to enable the foot pedal 14 to operate without any external wires. The power source 34 may comprise one or more batteries, a battery pack, a receptacle for receiving one or more batteries or a battery pack, combinations thereof, and the like. In some embodiments, the power source 34 may be rechargeable and be associated with a charging port to receive electrical power for recharging from an external device or system, such an electrical outlet.

The transmitter 24 is coupled with the sensing element 22 and operable to wirelessly transmit the pedal position signal provided by the sensing element 22 for reception by the receiver 16. The transmitter 24 may include any element or combination of elements operable to wirelessly transmit the pedal position signal, including processors and antennas, for reception by the receiver 16. For example, the transmitter 24 can include radio and/or infrared transmitting elements. The transmitter 24 may additionally include other elements to facilitate coupling with the sensing element 22. For example, the transmitter 24 may include or be coupled with an analog-to-digital converter, digital-to-analog converter, and other signal processing elements. In some embodiments, portions of the transmitter 24, such as the antenna, may be positioned outside of the pivotable housing 20 to facilitate signal transmission. However, in other embodiments, the transmitter 24 may be entirely enclosed by the pivotable housing 20.

In some embodiments, the transmitter 24 may include a digital radio transmitter, such as a ZigBee-compliant (IEEE 802.15.4) transmitter operable to encode the pedal position signal into a plurality of digital packets. For example, the transmitter 24 may include an XBee radio module manufactured by MaxStream, Inc. of Lindon, Utah. However, other methods may be utilized by the transmitter 24 to transmit signals, including Bluetooth, WiFi, ultra wide-band, Wi-Max, frequency and/or amplitude modulation, combinations thereof, and the like. The transmitter 24 may be adapted to transmit digital signals, analog signals, and/or a combination of digital and analog signals. In some embodiments, the effective communication range between the transmitter 24 and receiver 16 may controlled by varying the output power of the transmitter 24.

In embodiments including the limit switch 30, the transmitter 24 may be coupled with both the sensing element 22 and limit switch 30. In such embodiments, the transmitter 24 is operable to transmit the pedal position signal in a manner that corresponds to the signals provided by the sensing element 22 and transmitter 24. For example, the potentiometer 26 can provide a potentiometer position signal, the limit switch 30 can provide a limit switch position signal, and the transmitter 24 can transmit the pedal position signal in a manner that reflects both the potentiometer and limit switch signals.

Further, the transmitter 24 may also be coupled with the power source 34 and transmit the pedal position signal with an indication of the status of the power source 34, such as battery level. Thus, the pedal position signal transmitted by the transmitter 24 may indicate the position of the potentiometer 26, the status of the limit switch 30, and the status of the power source 34. However, the pedal position signal may only indicate the position of the pivotable housing 20 as sensed by the sensing element 22 in some embodiments.

The pedal position signal may also identify and/or authenticate the operator. For example, the operator may fully depress the pivotable housing 20 three times, or in any other unique sequence, to cause the transmitter 24 to transmit the pedal position signal with an identification and/or authentication of the operator. Such identification can be used by the transmitter 24, receiver 16, and welding system 12 to automatically provide configuration settings previously set by the operator in the event the control system 10 and welding system 12 are used by more than one operator. The foot pedal may also include one or more functionable inputs 48, such as buttons, switches, and the like, that may be functioned by the operator for identification and authentication purposes. The inputs 48 may also be used to turn the foot pedal 14 off and on.

In embodiments where the pedal position signal indicates more than the position of the pivotable housing 20, use of digital radio methods to transmit the signal may be desirable to limit the amount of communication required between the foot pedal 14 and receiver 16. For example, a single digital radio packet may indicate: one or more positions of the pivotable housing 20 as sensed by potentiometer 26; the status of the limit switch 30; the status of the power source 34; the identity of the operator; and/or various communication information such as the identity of the transmitter 24 and the channel being utilized by the control system 10.

In some embodiments, the transmitter 24 may be reprogrammed by the operator to modify the manner in which the pedal position signal is transmitted. For example, the foot pedal 14 may include a transmitter programming interface 32, such as a USB, RS-232, or other wired or wireless data interface, associated with the transmitter 24 to enable the operator to reprogram and/or otherwise communicate with the transmitter 24. For instance, the transmitter 24 may be programmed to process, adjust, or otherwise modify the pedal position signal before transmission to the receiver 16, such as by modifying the minimum and maximum values to be provided to the welding system 12.

In some embodiments the potentiometer 26 may provide a linear (direct) relationship between its output and the position of the pivotable housing 20—such as by providing a 0% output when the pivotable housing 20 has not moved and a 100% output when the pivotable housing 20 is fully depressed. Such a linear relationship may not be desirable in all environments and the transmitter 24 may be programmed to scale the signal provided to the potentiometer 26 to more desirable levels—such as by correlating the maximum position indicated by the pedal position signal to where the pivotable housing 20 is depressed only 80% as sensed by the potentiometer 26. The receiver 16 may additionally or alternatively perform this functionality.

The transmitter 24 may also be programmed with a unique identifier, channel information, network information, and/or other communication information to enable the transmitter 24 and receiver 16 to communicate with limited interference from other devices. For example, in some embodiments, the foot pedal 14 may be one of several remote devices associated with the welding system 12 and the communication information enables the transmitter 24 and receiver 16 to communicate without significantly interfering with the other remote devices. Further, the foot pedal 14 may be associated with several welding systems 12 to separately or simultaneously control their functionality.

In some embodiments, the fool pedal 14 may be configured for a sleep mode to extend the life of the power source 34. For example, if the sensing element 22 and/or limit switch 30 detect that the pivotable housing 20 has not been depressed for a certain time period, the foot pedal 14 may enter a sleep mode to only periodically utilize the sensing element 22. The configuration of the sleep mode may be varied by utilizing the transmitter programming interface 32, such as by defining when and if the sleep mode should be utilized and the various sleep and wake time periods utilized by the sleep mode.

Figure 4:
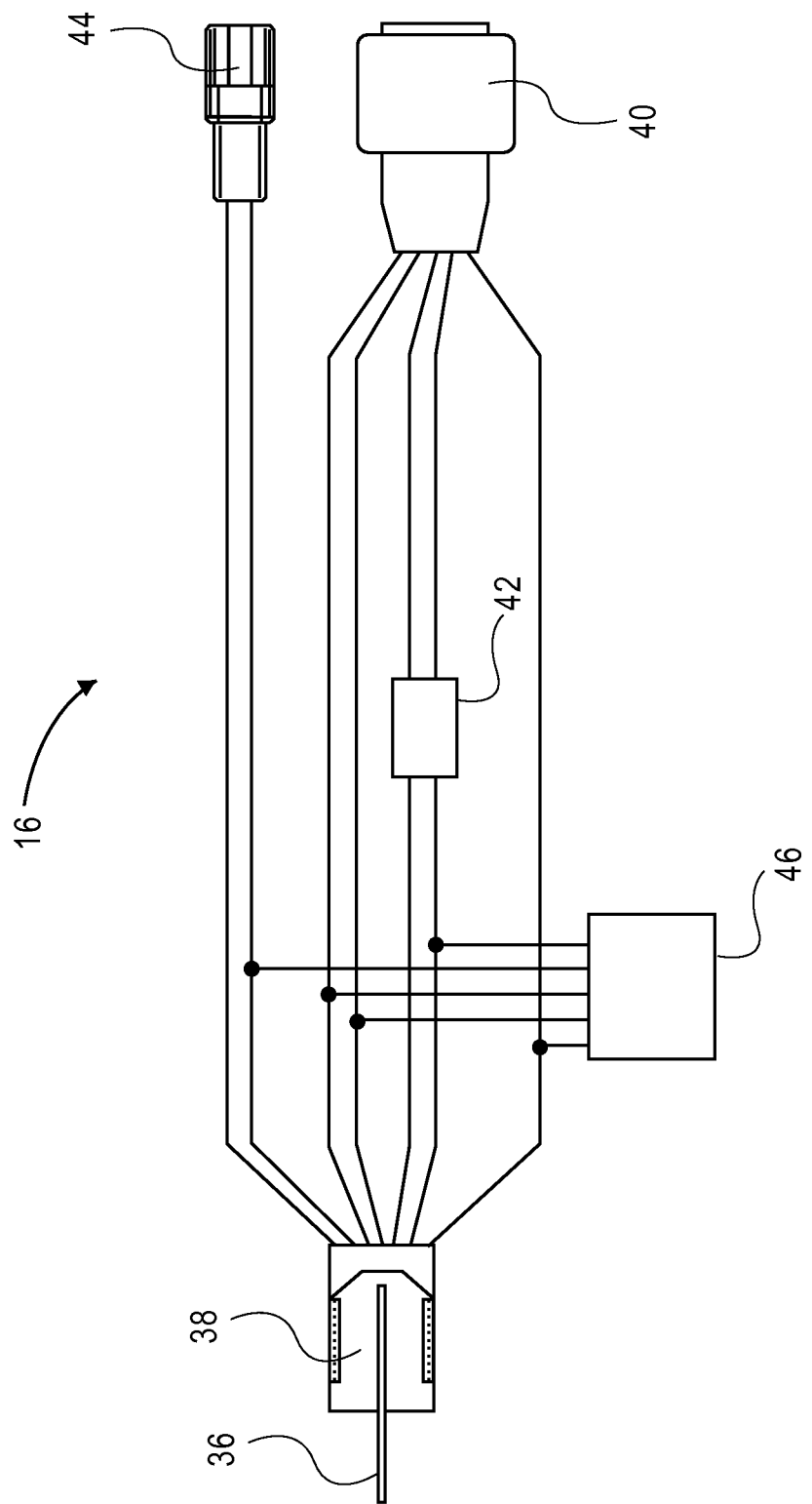
FIG. 4 is a schematic diagram of some components of a receiver configured in accordance with various embodiments of the present invention.
Figure 6:
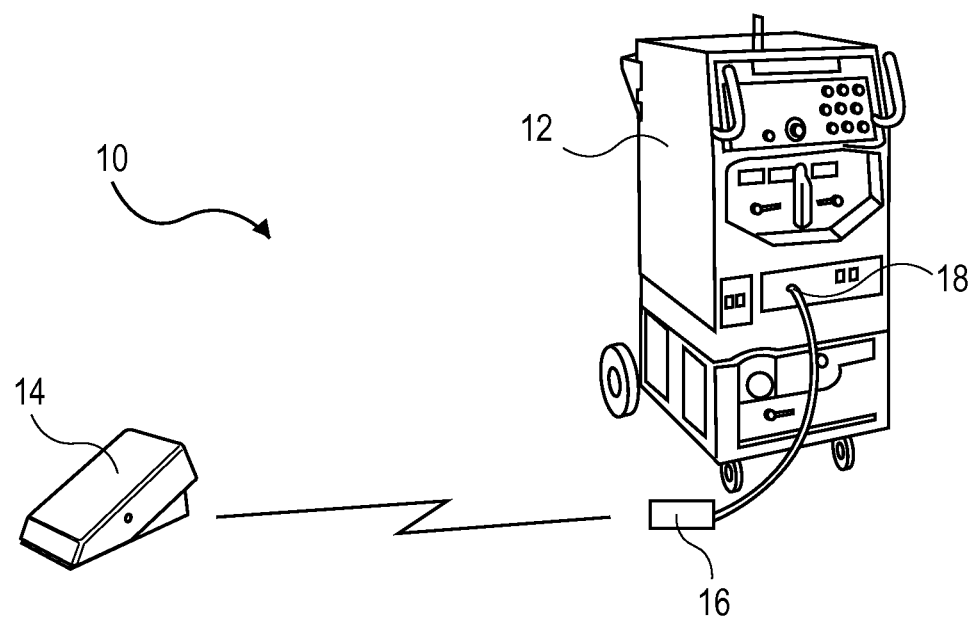
FIG. 6 is an environmental view of the foot pedal of FIGS. 1-4 and receiver of FIG. 5 being associated with a welding system.

Referring to FIGS. 4-6, the receiver 16 is operable to receive signals transmitted by the transmitter 24 and couple with the electrical control interface 18 of the welding system 12 to control the welding system 12 based on the received signals. The receiver 16 may include an antenna 36 operable to wirelessly receive signals transmitted by the transmitter 24, a processor 38 coupled with the antenna 36 that is operable to process received signals, and a connector 40 coupled with the processor 38 that is operable to connect with the electrical control interface 18 to provide processed signals thereto. The various elements of the receiver 16 may be discrete elements coupled together utilizing wired or wireless connections. In some embodiments, portions of the receiver 16, such as the antenna 36 and processor 38, may be integral.

The antenna 36 may be any element or combination of elements operable to receive signals transmitted by the transmitter 24. In embodiments where the transmitter 24 transmits radio frequency signals, the antenna 36 may include a radio frequency antenna and associated circuitry. For example, the antenna 36 may be matched with the transmitter 24 to ensure the proper reception of signals. In embodiments where the transmitter 24 transmits infrared signals, the antenna 36 may be an infrared detector (photodetector). Thus, the antenna 36 is not necessarily limited to receiving radio frequency signals using one or more conductive elements. The antenna 36 may be internal to the receiver housing and/or be an external antenna operable to couple with the receiver 16.

In some embodiments, the receiver 16 may include a relay 42 coupled with the processor 38 and connector 40. The relay 42 is operable to switch when controlled by the processor 38 to mimic the functionality of the limit switch 30, as is discussed in more detail below. The relay 42 may include any controllable switches operable to be controlled by the processor 38, including latching relays, reed relays, polarized relays, machine tool relays, solid state relays, combinations thereof, and the like.

The processor 38 is coupled with the antenna 36 and operable to process signals for use by the welding system 12, such as by converting the signal into an appropriate format for reception by the electrical control interface 18 and use by the welding system 12. For example, the pedal position signal may be an encoded digital radio signal and the processor 38 may decode the digital radio signal to generate an analog ratio metric signal for use by the welding system 12.

The processed pedal position signal provided to the welding system 12 may be a digital and/or an analog signal. For example, the processor 38 may include various switching elements and/or logic to present the processed pedal position signal as a variable voltage signal, a variable current signal, a variable resistance signal, a pulse-width modulated (PWM) signal, an unencoded digital signal, an encoded digital signal, combinations thereof and the like.

The processor 38 may also scale the pedal position signal into a voltage or current range acceptable for use by the welding system 12. For example, the welding system 12 may require a 0-10V signal to be provided through the electrical control interface 18 to control welding current. If the amplitude to the pedal position signal received by the receiver 16 is not within this range, the processor 38 may scale (e.g., amplify) the pedal position to the appropriate range. Such a configuration enables the receiver 16 to be adapted to universally couple with any welding system 12 and electrical control interface 18 to provide appropriate control signals thereto.

The processor 38 may also process the pedal position signal to function the relay 42. For example, as discussed above, the pedal position signal may include an indication of the status of the limit switch 30. In such embodiments, the processor 38 may identify the status of the limit switch 30 based on the pedal position signal and function the relay 42 to correspond to the position of the limit switch 30. Such a configuration enables the control system 10 to be used with welding systems that require both a variable pedal position input and a limit switch input (ground common or positive common).

For example, when the pivotable housing 20 is at least partially pivoted, the limit switch 30 may close to provide the limit switch position signal, which may be represented by the transmitted pedal position signal. The processor 38 may process the pedal position signal to determine that the limit switch 30 is closed and provide an appropriate signal to the relay 42 to close the relay 42. Thus, the relay 42 may mimic the functionality provided by limit switches included within conventional cabled control devices. Signals provided by the relay 42 may be represented by the processed pedal position signal provided to the welding system 12 through the connector 40.

The transmitter 24 may transmit signals for reception by the receiver 16 at any interval. In some embodiments where digital radio methods are employed, a packet corresponding to the pedal position signal is transmitted about every 50 ms. However, the control system 10 may be operable to vary this transmission rate to increase or decrease system latency. For example, system latency may be reduced by increasing the rate at which the packets are transmitted. Alternatively, to reduce power consumption by the foot pedal 14 and receiver 16, the rate at which the packets are transmitted may be reduced.

The processor 38 may also provide other signal processing functions. For example, the processor 38 may process the pedal position signal to ensure that the pedal position signal is authentic and not an interfering signal transmitted by a device other than the foot pedal 14. For example, the processor 38 may be provided with a unique identifier, channel information, network information, and/or other communication information to correspond to the communication information provided to the transmitter 24. In some embodiments, the processor 38 may be reprogrammable to enable the operator to provide selected communication and control information to the processor 38.

For example, the receiver 16 may include a receiver programming interface 44, such as a USB, RS-232, or other wired or wireless data interface, associated with the processor 38 to enable the operator to reprogram and/or otherwise communicate with the processor 38. For example, the processor 38 may be programmed to process the pedal position signal in any desired manner before the signal is provided to the welding system 12 through the connector 40. The processor 38 may also programmed with the communication information discussed above. For example, in some embodiments, the foot pedal 14 may be one of several remote devices associated with the welding system 12 and the communication information enables the transmitter 24 and receiver 16 to communicate without significantly interfering with the other remote devices. The receiver 16 may also be configured to receive control signals from remote devices other than the foot pedal 14.

The processor 38 may include any elements or combination of elements operable to perform the various functions discussed herein. For example, the processor 38 may include a computing device, a microprocessor, a microcontroller, a programmable logic device, a digital signal processor, analog or digital logic, combinations thereof, and the like. In some embodiments, the processor 38 may include or be coupled with an analog-to-digital converter, digital-to-analog converter, and other signal processing elements.

The connector 40 is coupled with the processor 38 and operable to connect with the electrical control interface 18 associated with the welding system 12 to provide the processed pedal position signal thereto. In embodiments where the electrical control interface 18 provides an interlace for a wired foot pedal, the connector 40 may mimic the configuration of the connector utilized by the wired foot pedal to enable the control system 10 to easily replace the wired foot pedal. Thus, in some embodiments, the connector 40 may present a standard electrical interface for connecting with the electrical control interface 18 of the welding system 12.

In some embodiments, the connector 40 may present a universal interface to connect with electrical control interlaces associated with a plurality of welding systems to enable the control system 10 to function in a variety of environments. However, as the welding systems may each present different electrical interface configurations, the connector 40 may be adaptable by the operator to conform to a desired electrical interface configuration. For example, the connector 40 may include a connector base 40a connected with the processor 38 and a plurality of interface harnesses 40b corresponding to a plurality of electrical interfaces utilized by different welding systems. Each interface harness 40b is operable to interchangeably mate with the connector base 40a to enable the receiver 16 to couple with varying electrical interfaces. However, in some embodiments, the connector 40 may present a fixed electrical interface or be replaceable with other connectors to facilitate coupling with the welding system 12.

The connector 40 may also enable the receiver 16 and its various components to be powered by the welding system 12 by receiving an electrical signal from the welding system 12. In some embodiments, the receiver 16 may include power conditioning circuitry to enable it to be powered by welding systems that present varying voltages and currents. Utilization of the connector 40 to receive power enables the receiver 16 to be compactly configured without requiring an internal power source such as a battery or battery pack. However, in some embodiments, the receiver 16 may include an internal power source to function independent of any power provided by the welding system 12 through the connector 40.

Further, the receiver 16 may receive other signals from the welding system 12 through the connector 40. For example, the receiver 16 may be adapted to receive control, configuration, and/or command signals from the welding system 12 to dictate how the pedal position signal is to be received by the receiver 16 and/or processed and provided to the welding system 12. Thus, for instance, the receiver 16 may receive communication information from the welding system 12 to facilitate its communication with the foot pedal 14.

In some embodiments, the receiver 16 may include one or more indicators 46 coupled with the processor 38 and operable to indicate the status the receiver 16. For example, the indicators 46 may be operable to indicate the status of the pedal position signal such as by illuminating while the receiver 16 is receiving the pedal position signal from the foot pedal 14. The indicators 46 may also indicate the status of the connection with the welding system 12, such as by illuminating when the connector 40 is properly connected to the electrical control interface 18. In some embodiments, the processor 38 may identify the status of the power source 34 of the foot pedal 14 utilizing the pedal position signal and the indicators 46 may indicate the power source status to inform and alert the operator. The indicators 46 may include various indicating elements such as LEDs, seven segment displays, LCD monitors, speakers, combinations thereof, and the like.

The control system 10 may be configured to reduce the lag time between operation of the foot pedal 14 and the output provided by the welding system 12. For example, the transmitter 24 may be configured to transmit the pedal position signal with a slop command after the foot pedal 14 is returned to its rest position to enable the receiver 16 to identify that the foot pedal 14 is at rest and immediately provide the appropriate signal to the welding system 12 to halt operation. Alternatively, to increase lag time, the transmitter 24 may stop transmitting as soon as the foot pedal 14 returns to the rest position such that the receiver 16 holds the pedal position associated with the last received pedal position signal for a short time until it is determined that the transmitter 24 has stopped transmitting.

In operation, the operator may connect the receiver 16 to the welding system 12. For example, the operator may connect the connector 40 with the electrical control interface 18 of the welding system 12. In some embodiments, the operator may select one of the harnesses 40b for coupling with the connector base 40a to enable the connector 40 to properly mate with the electrical control interface 18. The operator may position the foot pedal 14 in any desirable location and function the foot pedal 14 by pivoting the pivotable housing 20. The sensing element 22 senses the position of the pivotable housing 20 and the transmitter 24 transmits the pedal position signal to the receiver 16. The processor 38 processes the received pedal position signal, such as by decoding and/or scaling the signal, and the processed signal is provided to the welding system 12 using the connector 40. The welding system 12 utilizes the received signal to control its operation, such as by varying its welding current in response to the pedal position. Thus, the operator may continuously control the operation of the welding system 12 by changing the position of the pivotable housing 20.

It is believed that embodiments of the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A receiver operable to be utilized with a welding system including an electrical control interface, the receiver comprising:
    an antenna operable to wirelessly receive a pedal position signal generated by a remote foot pedal, wherein the pedal position signal transmitted by a transmitter includes an indication of a status of a limit switch that is operable to be switched when a housing of the remote foot pedal is at least partially pivoted;
    a processor coupled with the antenna and operable to process the received pedal position signal to define a control signal to vary the output current of the welding system; and
    a connector coupled with the processor and operable to connect with the electrical control interface associated with the welding system to provide the control signal thereto;
    the processor being operable to provide the processed pedal position signal in a form selected from the group consisting of a variable voltage signal, a variable current signal, a variable resistance signal, a pulse-width modulation signal, an unencoded digital signal, and an encoded digital signal.

2. The receiver of claim 1, further including a relay coupled with the processor and the connector, the processor operable to engage and disengage the relay based on at least a portion of the pedal position signal.

3. The receiver of claim 2, wherein the processed pedal position signal provided to the welding system through the connector includes an indication of the relay position.

4. The receiver of claim 1, wherein the pedal position signal is an encoded digital radio signal and the processor is operable to decode the received pedal position signal to generate the processed pedal position signal.

5. The receiver of claim 1, further including an indicator operable to indicate the status of the pedal position signal.

6. The receiver of claim 1, wherein the processor is operable to be powered by the welding system through the connector.

7. The receiver of claim 1, wherein the processor is operable to scale the received pedal position signal to generate the processed pedal position signal.

8. A wireless control system for a welding system including an electrical control interface, the control system comprising:
    a foot pedal including—
        a pivotable housing,
        a sensing element coupled with the pivotable housing and operable to sense a position of the pivotable housing and provide a corresponding pedal position signal, and
        a transmitter coupled with the sensing element and operable to wirelessly transmit the pedal position signal; and
    a receiver including—
        an antenna operable to wirelessly receive the pedal position signal generated by the foot pedal,
        a processor coupled with the antenna and operable to process the received pedal position signal to define a control signal to vary the output current of the welding system, and
        a connector coupled with the processor and operable to connect with the electrical control interface associated with the welding system to provide the control signal thereto,
        the processor being operable to provide the processed pedal position signal in a form selected from the group consisting of a variable voltage signal, a variable current signal, a variable resistance signal, a pulse-width modulation signal, an unencoded digital signal, and an encoded digital signal,
    wherein the foot pedal further includes a limit switch operable to be switched when the pivotable housing is at least partially pivoted, and the pedal position signal transmitted by the transmitter includes an indication of the status of the limit switch.

9. The control system of claim 8, wherein the receiver further includes a relay coupled with the processor and the connector, the processor operable to identify the status of the limit switch using the pedal position signal and engage and disengage the relay based on the status of the limit switch.

10. The control system of claim 8, wherein the sensing element is a rotary potentiometer.

11. The control system of claim 8, wherein the pedal position signal is an encoded digital radio signal and the processor is operable to decode the received pedal position signal to generate the processed pedal position signal.

12. The control system of claim 8, wherein the processor is operable to scale the received pedal position signal to generate the processed pedal position signal.

13. The control system of claim 8, wherein the receiver further includes an indicator operable to indicate the status of the received pedal position signal.

14. The control system of claim 8, wherein the receiver is operable to be powered by the welding system through the connector.

15. The control system of claim 8, further including a receiver programming interface coupled with the processor and operable to receive a programming input to modify the functionality of the processor.

16. A wireless control system for a welding system including an electrical control interface, the control system comprising:
    a foot pedal including—
        a pivotable housing,
        a rotary potentiometer coupled with the pivotable housing and operable to sense the extent to which the pivotable housing is pivoted and provide a corresponding potentiometer position signal,
        a limit switch operable to switch when the pivotable housing is at least partially pivoted and provide a corresponding limit switch position signal, and
        a transmitter coupled with the potentiometer and limit switch and operable to wirelessly transmit a pedal position signal corresponding to the potentiometer position signal and the limit switch position signal; and
    a receiver including—
        an antenna operable to wirelessly receive the pedal position signal generated by the foot pedal,
        a relay,
        an indicator operable to indicate the status of the received pedal position signal,
        a processor coupled with the antenna and relay and operable to process the received pedal position signal to define a control signal to vary the output current of the welding system, identify the status of the limit switch using the pedal position signal, and engage and disengage the relay based on the status of the limit switch, and
        a connector coupled with the processor and operable to connect with the electrical control interface associated with the welding system to provide the control signal thereto, the processed pedal position signal provided to the connector including an indication of the relay position,
        the processor being operable to provide the processed pedal position signal in a form selected from the group consisting of a variable voltage signal, a variable current signal, a variable resistance signal, a pulse-width modulation signal, an unencoded digital signal, and an encoded digital signal.

17. The control system of claim 16, wherein the pedal position signal is an encoded digital radio signal and the processor is operable to decode the received pedal position signal to generate the processed pedal position signal.

18. The control system of claim 16, wherein the processor is operable to scale the received pedal position signal to generate the processed pedal position signal.

19. The control system of claim 16, further including a receiver programming interface coupled with the processor and operable to receive a programming input to modify the functionality of the processor.

* * * * *